(12) United States Patent
Carey et al.

(10) Patent No.: US 6,401,321 B2
(45) Date of Patent: *Jun. 11, 2002

(54) APPLICATION OF GRIPS TO HANDLES

(75) Inventors: John Patrick Carey, Roscrea; Oliver Hood, Ballsbridge, both of (IE)

(73) Assignee: Burgoo Holdings Limited, Roscrea (IE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,085

(22) PCT Filed: May 2, 1997

(86) PCT No.: PCT/IE97/00036

§ 371 (c)(1),
(2), (4) Date: Dec. 10, 1998

(87) PCT Pub. No.: WO97/42022

PCT Pub. Date: Nov. 13, 1997

(30) Foreign Application Priority Data

May 2, 1996 (IE) ............................................... S960326

(51) Int. Cl.[7] .......................... B23P 11/02; B23P 19/02; B25B 27/14
(52) U.S. Cl. .............................. 29/450; 29/235; 29/280
(58) Field of Search .................... 29/450, 507, 235, 29/280, 282, 423; 137/454; 222/380

(56) References Cited

U.S. PATENT DOCUMENTS

| 3,126,524 A | * | 3/1964 | Mirsky et al. |
| 3,126,624 A | * | 3/1964 | Mirsky et al. |
| 3,750,267 A | * | 8/1973 | Otto .............................. 29/507 |
| 4,313,250 A | | 2/1982 | Sokolowski |
| 4,466,166 A | * | 8/1984 | Hogarth ....................... 29/235 |
| 5,407,026 A | | 4/1995 | Clark |
| 5,419,031 A | | 5/1995 | McLendon |
| 5,429,706 A | * | 7/1995 | Cresse et al. ................ 156/356 |
| 5,495,650 A | * | 3/1996 | Crepel et al. ................. 29/235 |

FOREIGN PATENT DOCUMENTS

| DE | 3505214 | 8/1985 |
| EP | 0145831 | 6/1985 |
| FR | 2386454 | 11/1978 |
| JP | 7-233803 | 9/1995 |
| WO | WO91/04126 | 4/1991 |

* cited by examiner

*Primary Examiner*—S. Thomas Hughes
*Assistant Examiner*—John C. Hong
(74) *Attorney, Agent, or Firm*—Jacobson Holman, PLLC

(57) ABSTRACT

A grip such as a golf grip is applied to a handle by initially engaging it with a guide which embraces the handle. The guide is pushed down over the handle, causing teeth to be pushed outwardly and engage the mouth of the grip and its inner bore. Air is injected into the grip by a pump via a cap hole valve to cause the grip to expand. The grip is simultaneously pulled onto the handle by pulling the guide down the shaft. The guide is then removed by pulling a tab which causes a part to be torn off.

27 Claims, 5 Drawing Sheets

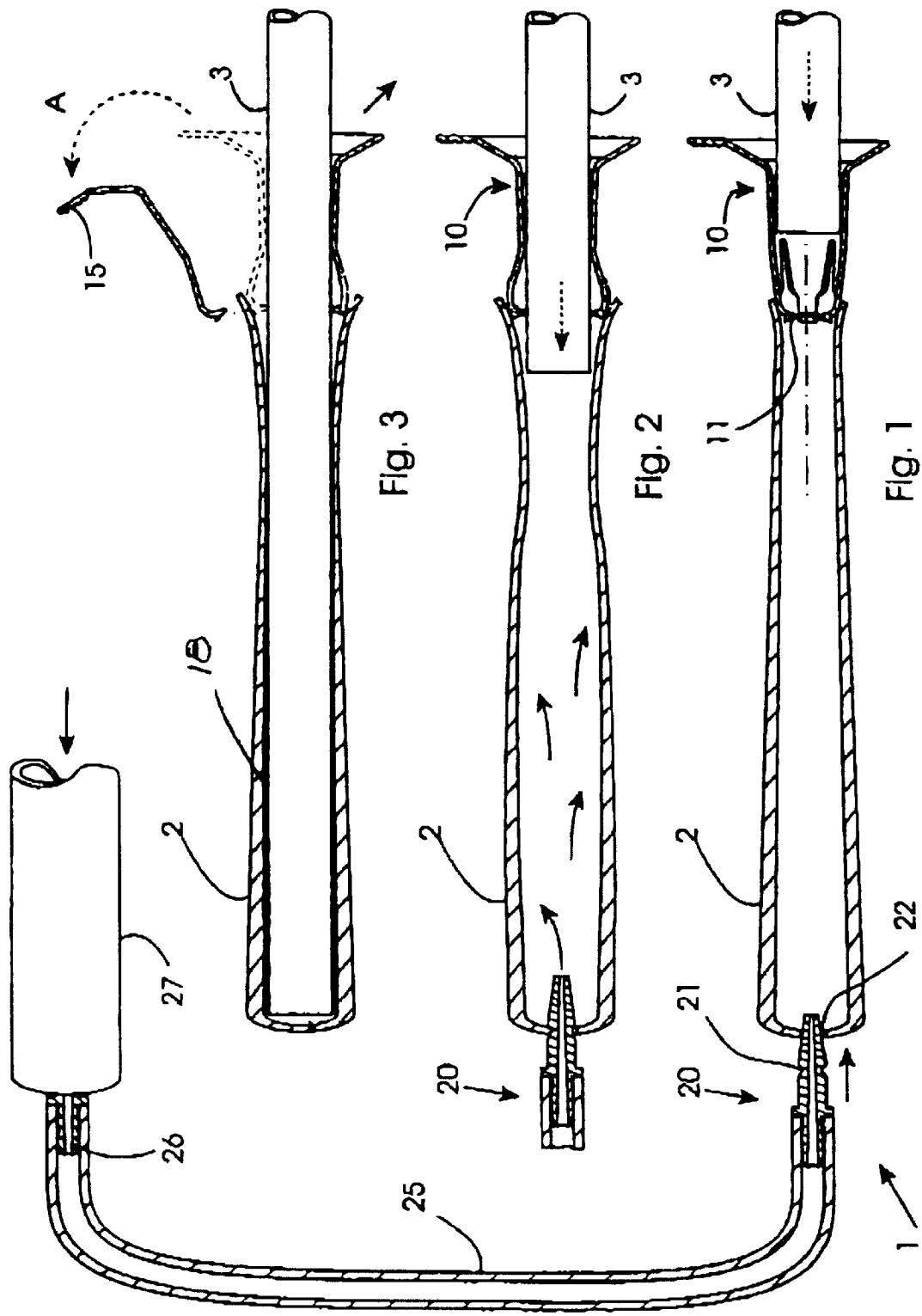

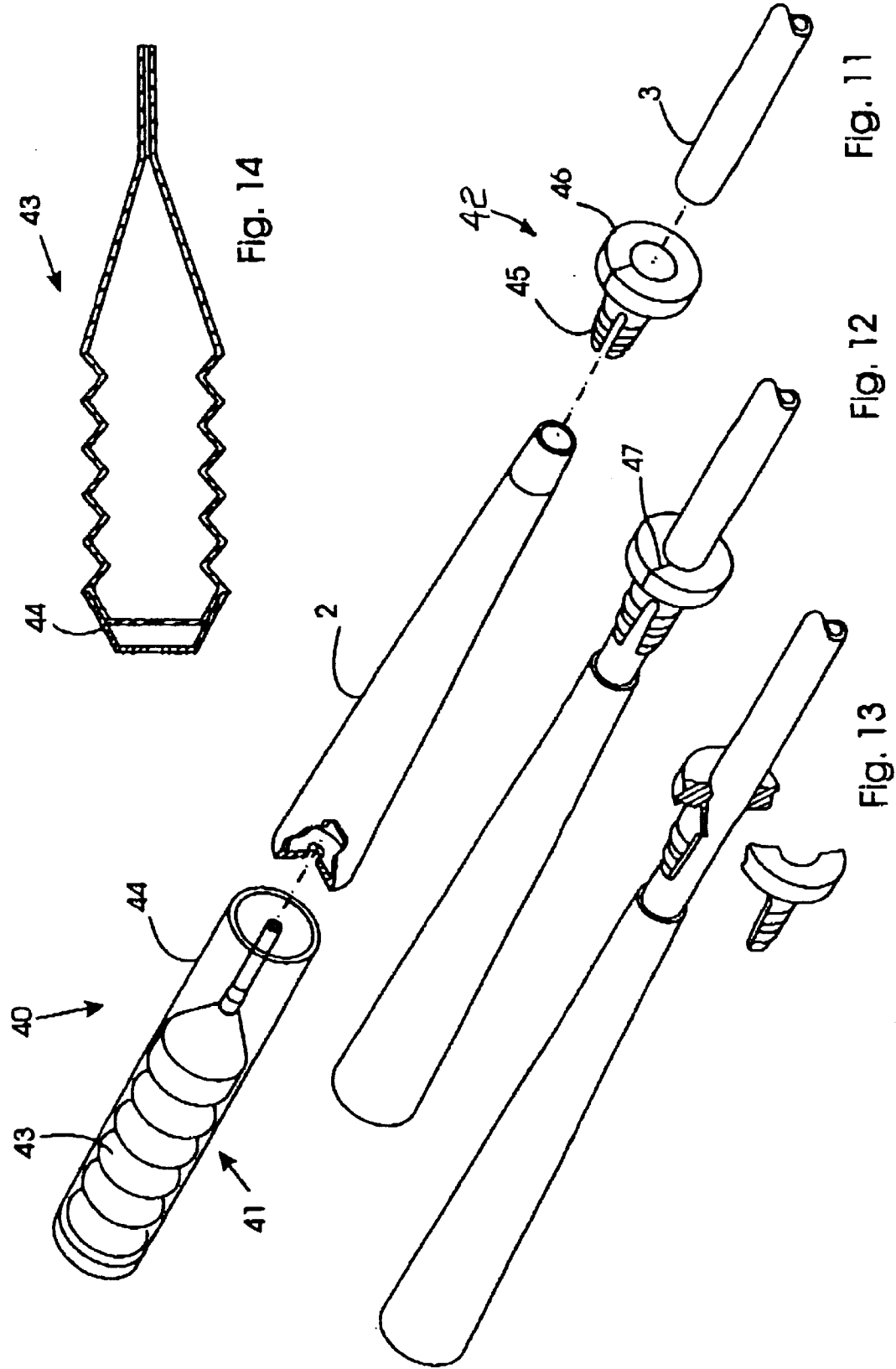

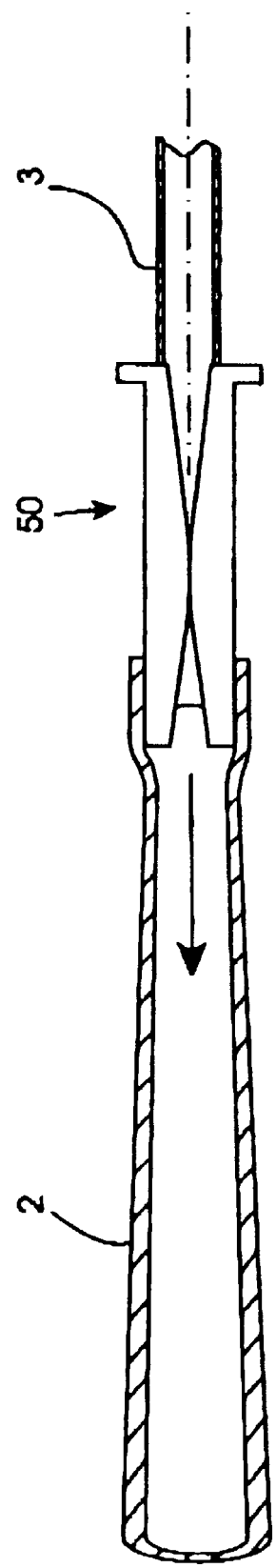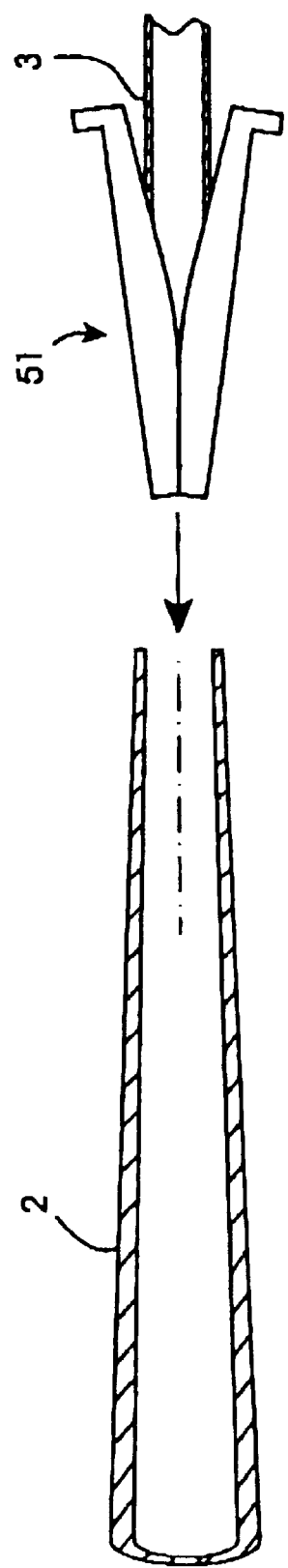
Fig. 16
Fig. 15

APPLICATION OF GRIPS TO HANDLES

FIELD OF THE INVENTION

The invention relates to the application of grips to handles, such as to a golf club shaft. However, the invention also relates to application of any type of tubular grip such as a baseball bat grip.

BACKGROUND OF THE INVENTION

Conventionally, a grip is applied to a golf club handle by placing the golf club shaft in a vice at a particular orientation. The grip is then lubricated by applying solvent such as white spirits into the grip and on the area of the shaft. The shaft may be covered with tape which provides the adhesive. Alternatively, the adhesive may be provided by a liquid adhesive applied directly to the shaft. While the shaft is clamped in the vice, the grip is pushed down over the shaft. This task must be carried out very quickly, before the lubricating effect of the solvent diminishes. It must also be carried out very carefully to ensure that the grip does not twist or distort locally at any location. Further, it is also important to ensure that the grip maintains a correct alignment by visually aligning markings on the grip with a datum such as a part of the clamp. After the grip has been pushed down over the shaft, a final check is made to ensure that it is in correct alignment and is not distorted.

Variations of this basic method are described in U.S. Pat. No. 5,407,026 (Karsten) and U.S. Pat. No. 5,429,706 (Cresse). It is also known to use large items of equipment which automate to application of a grip in manufacturing environments, as described in Japanese Specification No. JP 07233803 (Nichigo). The system described in the latter specification has four aligned stations, one of which supports the end of a grip and allows injection of air so that the grip is expanded as it is pushed onto the shaft.

At the other end of the system, there is a support which supports the end of the shaft. The system also has a pair of compression mechanisms which compress the grip intermediate the ends. The various stations of the system are relatively movable to cause the grip to be pushed over the shaft.

While the equipment described in the above specifications are generally suitable for manufacturers or professionals, they do not allow grips to be applied by the and user. This leads to the major disadvantage of users being slow to replace grips as they become worn because of the inconvenience of giving the item to specialists. Taking the example of golf, this can result in players using clubs which have poor grips, which affects enjoyment of the game.

Attempts have been made to facilitate easier application of grips by the end user. For example, U.S. Pat. No. 5,419,031 (McLendon) describes a grip which is rolled down onto the shaft. While this does allow application of a grip by an end user, it appears that the requirement for high material flexibility limits the choice of grip material which may be used. U.S. Pat. No. 4,313,250 (Sokolowski) describes a hand tool which extends along the length of the shaft and between the shaft and the grip to allow easier pushing of the grip onto the shaft. However, it appears that application of the grip to achieve the desired alignment would still be quite difficult for the end user.

SUMMARY OF THE INVENTION

The invention is therefore directed towards providing an apparatus and a method for application of a grip to a handle which provide for very simple and quick application of a grip by end users.

According to the invention, there is provided an apparatus for applying a tubular grip to a handle, the apparatus comprising:
  gas pump having a valve for connection to a cap hole of a grip, and
  a grip guide comprising:
    guide body having a through-hole for receiving a handle, and
    means for engaging the mouth of a grip.

Preferably, said engagement means comprises at least one pair of opposed teeth mounted for engaging the inner bore of the mouth of a grip.

In one embodiment, the teeth are resiliently mounted for radial movement outwardly to engage the grip mouth.

Preferably, the teeth are mounted whereby longitudinal movement of the handle through the guide causes outer radial movement of the teeth.

Ideally, the teeth are mounted on cantilevered supports having bevelled inner surfaces.

In one embodiment, the guide has a line of weakness to allow it to be broken off the handle after application of the grip.

In another embodiment, the guide has a pair lines of weakness between which there is a tear-off portion, and a tab connected to the tear-off portion to allow it to be torn off. Preferably, the line of weakness extends in the longitudinal direction along the guide.

In another embodiment, the line of weakness extends circumferentially around the guide.

In one embodiment, the guide comprises a flange which may be gripped by the user to pull the guide and grip along the shaft.

Preferably, the flange is splayed out for easy engagement of the guide with the shaft.

Preferably, the gas pump is an air pump.

In one embodiment, the apparatus further comprises a cap hole valve having a circumferential notch for snap-fitting engagement with the grip.

According to another aspect, the invention provides an apparatus for applying a tubular grip to a handle, the apparatus comprising:
  a grip guide comprising:
    a guide body having a through-hole for receiving a handle, and
    means for engaging the mouth of a grip.

In one embodiment, the apparatus further comprises a valve means for connection of the grip to a pump means at an aperture in the grip, such as a cap hole.

According to another aspect, the invention provides a method of applying a tubular grip to a handle, the method comprising the steps of:
  presenting the mouth of the grip to the end of the handle and engaging the mouth with a guide which embraces the handle,
  expanding the grip by injection of a gas into the grip and simultaneously causing the guide to pull the grip along the handle until the grip is in position on the handle, and
  removing the guide.

Preferably, the guide comprises teeth which are pushed outwardly to engage the grip mouth at its inner bore as the guide is pushed onto the handle.

In one embodiment, the teeth are pushed outwardly by action of the leading end of the handle pushing against bevelled inner surfaces of teeth supports.

Ideally, the guide is removed after application of the grip by breaking it. Ideally, the guide is broken along a line of weakness.

In one embodiment, the guide is broken by pulling a tab to remove a tear-off portion between a pair of lines of weakness.

Preferably, the grip is expanded by injection of air from a pump.

In one embodiment, the grip is aligned on the handle during application by alignment of the tab on the guide with a datum.

BRIEF DESCRIPTION OF THE DRAWINGS

The invention will be more clearly understood from the following description of some embodiments thereof, given by way of example only with reference to the accompanying drawings in which:

FIGS. 1 to 3 are diagrammatic views showing the three major steps in application of a golf grip to a shaft;

FIGS. 11 to 13 inclusive are perspective views showing application of a grip using an alternative apparatus of the invention and FIG. 14 is a diagrammatic view showing part of an air pump of the apparatus; and FIGS. 15 and 16 are diagrammatic side views showing application of a grip using a further apparatus of the invention.

DETAILED DESCRIPTION OF THE PREFERRED EMBODIMENTS

Figure 5:
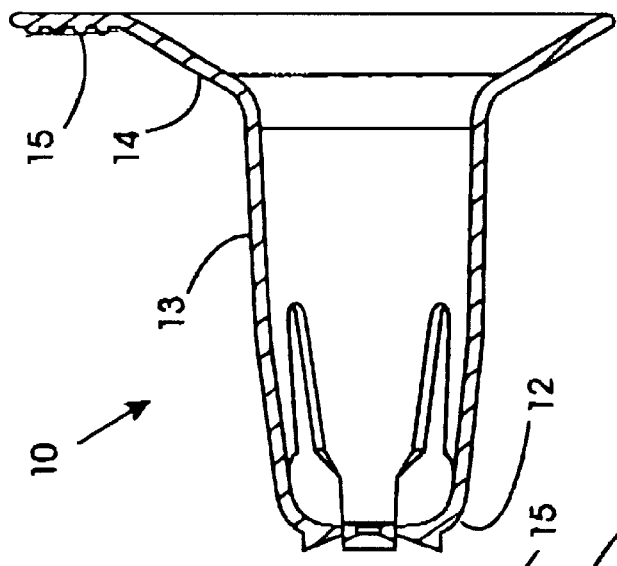
FIGS. 4, 5 and 6 are perspective, cross-sectional side, and end views respectively of a guide of a grip application apparatus of the invention.
Figure 6:
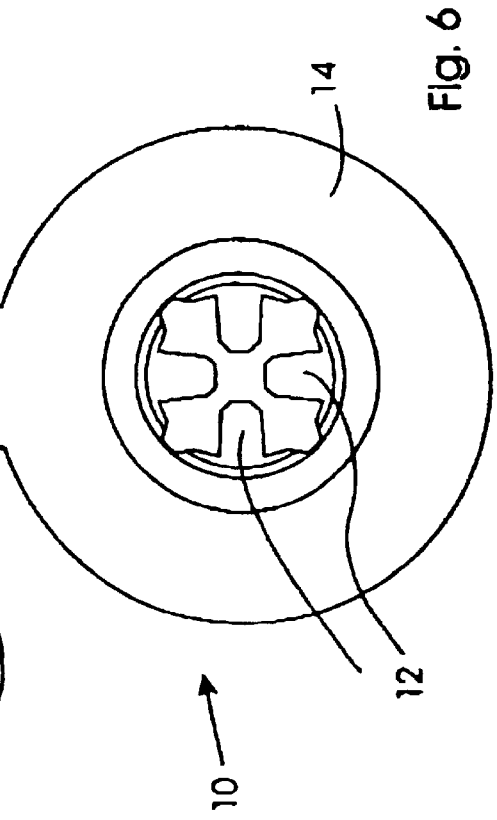

Referring to the drawings, and initially to FIGS. 1 to 6 there is shown a grip application apparatus 1 of the invention and the manner in which it is used. The apparatus 1 is shown in FIGS. 1 to 3 being used applying a golf club grip 2 to a golf club shaft 3.

Figure 4:
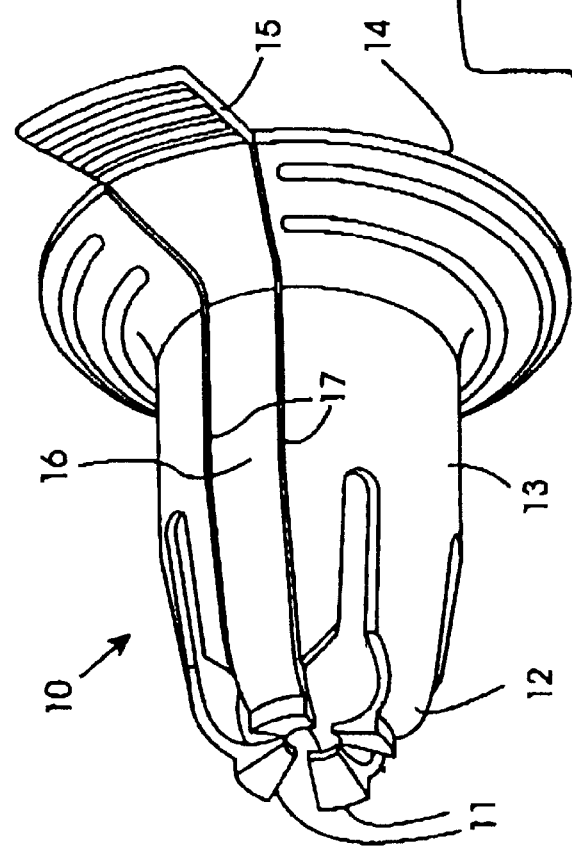

Referring particularly to FIG. 4, the apparatus 1 comprises a guide 10 which has four teeth 11 which are integral on longitudinal resilient fingers 12 cantilevered on a tubular body 13 of the guide 10. At the other end of the guide 10, the body 13 is splayed out to form a flange 14. A tab 15 is connected to a tear-off part 16 of the guide 10 between a pair of lines of weakness 17.

The apparatus 1 also comprises a one-way cap hole valve 20 having a circumferential notch 21. The valve 20 is connected to a flexible tube 25 which terminates in a valve 26 which connects it to an air pump 27 which in this embodiment is a "bicycle pump".

The apparatus 1 may be used in a very simple manner to apply the grip to the shaft 3. An adhesive is applied to the end of the shaft 3 according to the grip manufacturer's specifications. The guide 10 is then partly pushed over the end of the shaft 3, flange first. The mouth of the grip 2 is pushed over the teeth 11, which at this stage are at their innermost positions. The cap hole valve 20 is pushed into a cap hole 22 of the grip 2 until it snap-fits in position at the notch 21.

As shown in FIG. 2, the guide 10 is pushed downwardly on the shaft 3. Because the teeth fingers 12 have an inner curved and generally bevelled configuration, the leading end of the shaft 3 pushes the teeth outwardly as shown in FIG. 2 so that the teeth 11 engage the inner bore of the mouth of the grip 2. At this stage, air is pumped into the grip 2 by the pump 27 and the guide 10 is simultaneously pushed down along the shaft 3 preferably with the assistance of a second person. The injection of air causes the grip to expand as shown in FIG. 2 and allows it to be very easily pulled down on the shaft by the guide 10. This action is continued until the position of FIG. 3 is reached when the grip in place. It is no longer necessary to inject air and the grip 2 relaxes back to its original position engaged tightly around the shaft 3. The guide 10 is then disengaged from the grip 2 and is removed by the user pulling the tab 15 as shown by the arrow A in FIG. 3, thus tearing away the tear-off portion 16 between the lines of weakness 17. The guide 10 is thus disposable.

The adhesive is then allowed to cure to secure the grip in position. The cured adhesive is indicated by the numeral 18 in FIG. 3.

It would be appreciated that the invention provides for very simple and quick application of a grip to a handle by end users. It is only necessary to engage the grip on the guide, pump air into the grip using a conventional pump such as a bicycle pump, and push the guide down along the handle. The tab 15 on the guide may be used for alignment of the grip, thus ensuring that it is easily aligned. In the event that the grip is mis-aligned, it is very easy to re-expand the grip and adjust the position before disengaging the guide 10.

Figure 10:
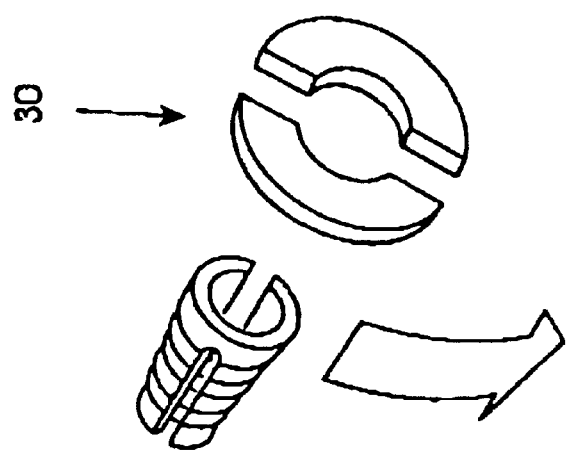
FIGS. 9 and 10 are diagrammatic views illustrating the manner in which the guide of FIGS. 7 and 8 is removed from a shaft.
Figure 9:
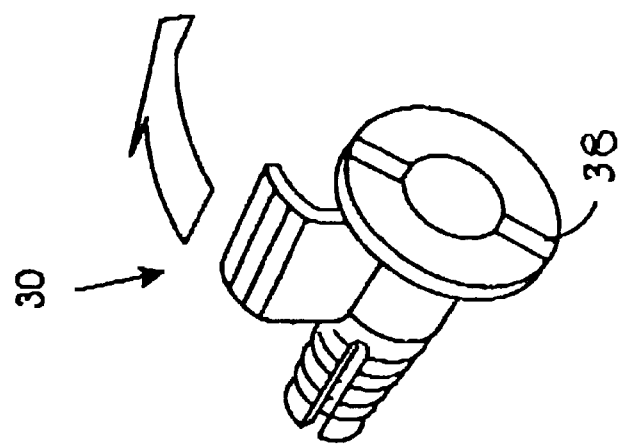
Figure 7:
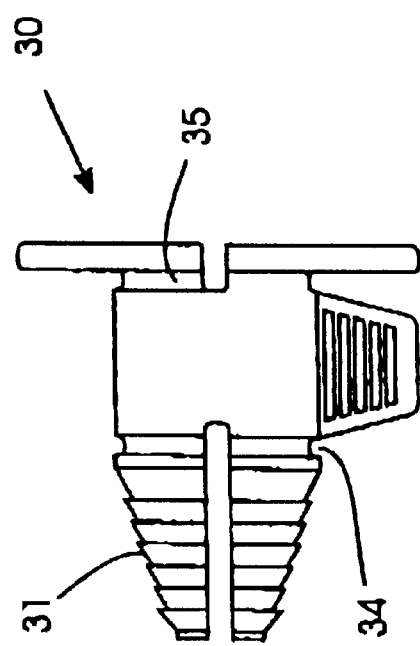
FIGS. 7 and 8 are side views of an alternative guide.
Figure 8:
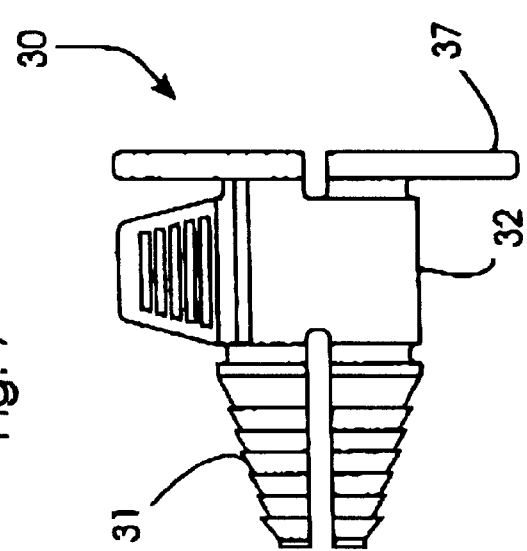

The invention is not limited to the embodiment illustrated. For example, the guide may have a tear-off portion which extends circumferentially around the guide body. Such an arrangement is shown in FIGS. 7 to 10 in a guide 30 having a series of parallel teeth 31 on four resilient supports. The guide 30 has a body 32 connected to a tab 33 and connected by lines of weakness 34 and 35 to the teeth supports and a flange 37 having a notch 38. The guide 30 is removed after application of the grip by pulling the tab 33 to peel away the main body between the flange 37 and the teeth 31 as shown in FIGS. 9 and 10.

Referring now to FIGS. 11 to 14 inclusive, a still further apparatus 40 of the invention is illustrated. The apparatus 40 comprises a bellows air pump 41 and a guide 42. The pump 41 comprises a bellows 43 (best shown in FIG. 14) which has a one-way valve 44. The bellows 43 is mounted within a flexible sleeve 44a. The flexible sleeve may, however, be dispensed with. The guide 42 has two sets of opposed teeth 45 mounted directly on a flange 46 which has a line of weakness 47 on one side. To apply a grip using the apparatus 40, the pump 41 is used to inject air into the grip. Thus, the apparatus may be provided as a complete self-contained assembly comprising the pump and the guide as there is no need to provide an auxiliary pump such as a bicycle pump. In this embodiment, the guide 42 is simply broken off along the line of weakness 47 without the need for a tab.

Referring now to FIGS. 15 and 16, there is illustrated a still further construction of apparatus 50 comprising a two-part guide 51. The guide 51 comprises two identical parts which have a generally semi-circular inner surface so that when they meet the shaft can be pushed in-between. The inner side edges are curved so that when they engage at the outer end they can pushed into the mouth of the grip and then as the parts are pushed towards each other at the inner end they push outwardly against the inner bore of the mouth of the grip. The grip is then applied as described above for the other guides. The outer ends of the two parts may have teeth for engaging the mouth of the grip.

The pump and cap hole valve may be used for non-destructive removal of a grip. This is achieved by inserting the cap hole valve into the mouth of the grip when in position, covering the cap hole, and injecting air. This separates the grip from the handle, upon which the grip may be easily removed.

It will be appreciated that the invention provides for application of a grip in an extremely simple and inexpensive manner. There is no need for expensive equipment.

The apparatus may be provided in an inexpensive package in which there is one guide for each grip to be applied. For example, the invention may be provided as a set of grips with one guide per grip. The package may or may not include a pump because a conventional pump may be used. For example, the package may include guides and one or more cap hole valves for fitting to a conventional pump.

The invention allows for a large expansion of the grip markets by allowing much easier re-gripping of handles such as golf club shafts-both benefiting the end user and the manufacturers.

The invention is not limited to the embodiments hereinbefore described but may be varied within the scope of the claims in construction and detail.

What is claimed is:

1. Apparatus for applying to a tubular handle a tubular grip of resilient material comprising an inner bore, an end cap closing the bore and a distal open grip mouth for the bore, the apparatus comprising:
   a gas pump;
   a cap valve connected to the pump for insertion into the interior of the cap through a cap hole in the end cap;
   guide means formed from a hollow separate cylindrical sleeve member having an interior surface slidable on and engaging an exterior surface of the tubular handle; and
   engagement means on the outer peripheral portion of the sleeve member for insertion into the distal open grip mouth and on subsequent radial expansion for engaging the grip.

2. An apparatus as claimed in claim 1, wherein said engagement means comprises at least one pair of circumferentially opposed teeth mounted for engaging the inner bore adjacent the open grip mouth.

3. An apparatus as claimed in claim 2, wherein the teeth are resiliently mounted for radial movement to engage the grip mouth.

4. An apparatus as claimed in claim 2, wherein the teeth are resiliently mounted whereby longitudinal movement of the handle through the guide means causes radial movement of the teeth.

5. An apparatus as claimed in claim 2, wherein the teeth are mounted on cantilevered supports having bevelled inner surfaces for engagement with the handle on its insertion into the guide means to move the teeth outwards against the bore.

6. An apparatus as claimed in claim 2, wherein the guide means has a line of weakness to allow it to be broken off the handle after application of the grip.

7. An apparatus as claimed in claim 2, wherein the guide means has a pair of lines of weakness between which there is a tear-off portion, and a tab connected to the tear-off portion to allow it to be torn off.

8. An apparatus as claimed in claim 2, wherein a line of weakness extends in the longitudinal direction along the guide means.

9. An apparatus as claimed in claim 2, wherein a line of weakness extends circumferentially around the guide means.

10. An apparatus as claimed in claim 2, wherein the guide means comprises a flange which may be gripped by the user to pull the guide and grip along a shaft.

11. An apparatus as claimed in claim 2, wherein the guide means comprises a flange splayed out for easy engagement of the guide means with a shaft.

12. An apparatus as claimed in claim 2, wherein the gas pump is an air pump is an air pump.

13. An apparatus as claimed in claim 2, further comprising the cap valve having a circumferential notch for snap-fitting engagement with the grip.

14. A hand-held apparatus for applying to a tubular handle a tubular grip of a resilient material comprising an inner bore, an end cap closing the bore and a distal open grip mouth for the bore, the apparatus comprising:
   guide means formed from a hollow separate cylindrical sleeve member having an interior surface slidable on and engaging an exterior surface of the tubular handle; and
   engagement means on the outer peripheral portion of the sleeve member for insertion into the distal open grip mouth and on subsequent radial expansion for engaging the grip, whereby insertion of gas through the grip from a gas pump expands the inner bore to permit sliding of the sleeve member and tubular grip along the handle.

15. An apparatus as claimed in claim 14, further comprising a valve means for connection of the grip to a gas pump means at an aperture in the end cap.

16. A method of applying a tubular grip to a handle, the method comprising the steps of:
   presenting a mouth of the grip to the end of the handle and engaging the mouth with a guide which embraces the handle,
   expanding the grip by injection of a gas into the grip and restraining the gas by the guide and simultaneously pulling the grip along the handle until the grip is in position on the handle, and
   removing the guide.

17. A method as claimed in claim 16, wherein the guide comprises teeth which are pushed outwardly to engage the grip mouth at its inner bore as the guide is pushed onto the handle.

18. A method as claimed in claim 17, wherein the teeth are pushed outwardly by action of the leading end of the handle pushing against bevelled inner surfaces of teeth supports.

19. A method as claimed in claim 16, wherein the guide is removed after application of the grip by breaking it.

20. A method as claimed in claim 19, wherein the guide is broken along a line of weakness.

21. A method as claimed in claim 20, wherein the guide is broken by pulling a tab to remove a tear-off portion between a pair of lines of weakness.

22. A method as claimed in any of claim 16, wherein the grip is expanded by injection of air from a pump.

23. A method as claimed in claim 21, wherein the grip is aligned on the handle during application by alignment of the tab on the guide with a datum.

24. A kit used for replacing a grip located at one end of a shaft of a sporting goods article, said kit comprising:
   an annular guide for fitting around the one end of the shaft in contact with the shaft and for sliding along the shaft,
   a replacement grip having two ends with one of said two ends being open for sealingly engaging and moving with said annular guide along the one end of the shaft, the other end of the grip having a cap hole, and
   a cap hole valve for insertion into said cap hole of said grip for inflating and expanding said grip when the grip is sealed at said one end by said annular guide and sealed at said other end by said cap hole valve connected to a pump forcing air into said grip through said cap hole valve to expand the grip and facilitating sliding of said grip along said shaft by the manual sliding of the annular guide along said shaft.

25. A kit as claimed in claim 24, wherein said cap hole valve includes a notch for engagement with a perimeter of said cap hole.

26. A kit as claimed in claim 24, wherein said annular guide includes at least one preformed line of weakness for destruction of said annular guide.

27. A kit as claimed in claim 24, wherein said annular guide includes a plurality of teeth for engagement with said one end of said grip.

* * * * *